April 19, 1927.
M. E. RAGG
1,625,682
OBSTETRIC APPLIANCE
Filed March 28, 1925
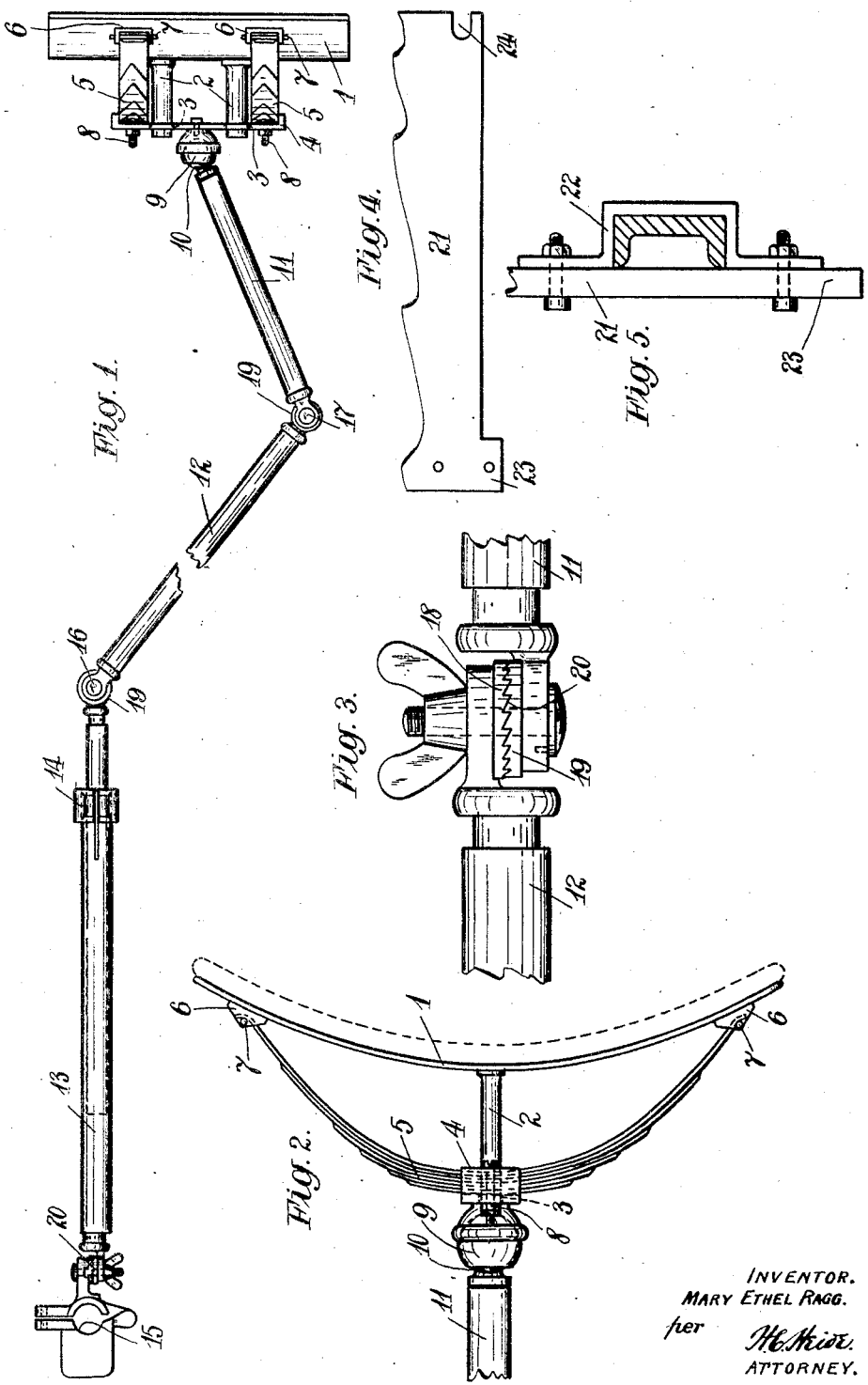
INVENTOR.
MARY ETHEL RAGG.
per
ATTORNEY.

Patented Apr. 19, 1927.

1,625,682

UNITED STATES PATENT OFFICE.

MARY ETHEL RAGG, OF UPPER NORWOOD, ENGLAND.

OBSTETRIC APPLIANCE.

Application filed March 28, 1925, Serial No. 19,030, and in Great Britain April 12, 1924.

This invention relates to a new or improved obstetric appliance for assisting women in labour.

An object of the present invention is to provide an appliance attachable to the bed or operating table and which is adapted to function as a support and thrust resisting device for the woman during the labour period, thus freeing the hands of the accoucheur or accoucheuse.

Broadly the invention comprises (1) a thrust resisting device adapted to be fixed to a convenient part of the foot of a bed or operating table, and (2) a support and thrust resisting device fixed to a convenient part, as, for example, the head of a bed, the support being placed against the woman's back and functioning to support the back and withstand the back pressure exerted by the woman.

It is to be understood that the back support and thrust resisting device may be used independently of the foot device, or vice versa.

The accompanying drawings show by way of examples only, an appliance for the back and a foot appliance.

In the drawings, Fig. 1 is a plan of the appliance for the back, Fig. 2 a view of the back support, Fig. 3 a view of the joints between the components of the rod or link system, Fig. 4 an elevation of the foot board and Fig. 5 a detail view relating thereto.

Referring to Figs. 1 to 3 of the drawings, this example of back support and thrust resisting device comprises a member 1 shaped to conform, or approximately so, to the appropriate part of a woman's back. The member 1 is suitably padded. This member 1 has spindles 2 passing through holes 3 in a bar 4. The spindles 2 and holes 3 form a slide-guide fitting. Between the bar 4 and the member 1 are springs 5, those shown being laminated leaf springs. The springs 5 bear on plates 6 attached to the member 1, pins 7 retaining the springs. The bows of the springs are attached to the bar 4 by screw unions 8. Thus the member 1 is spring mounted and capable of yielding or moving when pressure is applied thereto.

On the opposite face of the bar 4 to that carrying the springs 5, is attached the hollow seating component 9 of an universal joint, the globular component 10 of which is attached or forms part of the first member 11 of a rod or link system. This rod or link system consists of three rigid members, viz, 11, 12 and 13. The member 13 is telescopic, a clamp 14 locking the two parts together at the desired length. A clamp device 15 is attached to the outer end of member 13, this clamp device being fixed to, for example, the head rail or frame of the bedstead. Any other suitable attaching device may be used.

The rod or link system when in use must be rigid, a simple form being a single rod or bar (in lieu of the three shewn) extending from the supporting member 1 to the attaching device (clamp 15).

To better serve the functions for which the supporting and thrust resisting member is designed it is proposed to make the rod or link system articulated as shewn, so that adjustment of position of the supporting member in relation to a woman's back, and length of rod or link system, can be effected.

Adjustment of position of the supporting member in relation to a woman's back is desirable at various stages of the labour period, and alteration of the effective length of the rod or link system is desirable to accommodate various women.

The power of angular adjustment may be effected in many ways. By way of example only, there are provided two joints 16 and 17 between the supporting member 1 and the attaching device 15. These joints may be of any convenient form having locking provision as, for example, a set or thumb screw to ensure a rigid joint when set to the required position. Angular adjustment is secured by means of discs 18 and 19 having cooperating crown teeth 20.

The angular adjustment serves for angular positioning in relation to the woman's back, and also as regards the effective length. Alteration of the effective length is also effected by means of the telescopic member.

The supporting member 1 may be padded, or buffer devices may be provided on the member as, for example, a series of springs.

By way of example there is shewn in Figs. 4 and 5 one form of foot device which comprises a board 21 attached as by clamps or other suitable means 22 to the foot rail or frame of a bedstead. For example the board may have a depending flange 23 for clamping or otherwise fixing to the foot rail and a recess 24 fitting over a side rail. The woman's feet press against this board and the board acts as a thrust resisting device.

Folding handles or loops may be provided on or adjacent the foot device so that the woman pulls thereon.

The foot device may have stirrups in which the woman's feet are placed.

What I claim is:—

1. Obstetric appliance comprising in combination, a supporting and thrust resisting member for the woman's back, leaf springs on which said member is mounted, and means for attaching said member to a bedstead or operating table.

2. Obstetric appliance comprising in combination, a supporting and thrust resisting member for the woman's back, leaf springs on which said member is mounted, means for guiding said member, and means for attaching said member to a bedstead or operating table.

3. Obstetric appliance comprising in combination a supporting and thrust resisting member for the woman's back, leaf springs on which said member is mounted, means for guiding said member, an articulated rod system for attaching said member to a bedstead or operating table, one component of said rod system being telescopic, and step-by-step angular setting means for the joints between each section.

4. Obstetric appliance comprising in combination a supporting and thrust resisting member for the woman's back, springs on which said member is mounted, means for guiding said member, an articulated rod system for attaching said member to a bedstead or operating table, one component of said rod system being telescopic, and step-by-step angular setting means for the joints between each section.

5. Obstetric appliance comprising in combination, a supporting and thrust resisting member for the woman's back, leaf springs on which said member is mounted, means for attaching said member to a bedstead or operating table, and means for adjusting said supporting member in relation to the woman's back.

In testimony whereof, I affix my signature.

MARY ETHEL RAGG.